US008767246B2

(12) United States Patent
Mizes et al.

(10) Patent No.: US 8,767,246 B2
(45) Date of Patent: Jul. 1, 2014

(54) SYSTEM AND METHOD FOR PAGE ALIGNMENT IN A PRINTER

(71) Applicant: Xerox Corporation, Norwalk, CT (US)

(72) Inventors: Howard A. Mizes, Pittsford, NY (US); Michael C. Mongeon, Walworth, NY (US); Michael J. Severn, Rochester, NY (US); Joseph C. Sheflin, Macedon, NY (US); Michael J. Levy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 40 days.

(21) Appl. No.: 13/689,283

(22) Filed: Nov. 29, 2012

(65) Prior Publication Data
US 2014/0146329 A1  May 29, 2014

(51) Int. Cl.
G06K 15/00 (2006.01)
G06F 3/12 (2006.01)
G06K 15/22 (2006.01)
G06K 15/10 (2006.01)

(52) U.S. Cl.
USPC ......... 358/1.15; 358/1.12; 358/1.18; 358/1.4; 358/1.5

(58) Field of Classification Search
USPC ............... 358/1.12, 1.18, 1.15, 1.4, 1.5, 3.15, 358/3.23, 1.6, 1.9, 1.2, 3.24, 448, 474, 3.32, 358/483, 488, 496, 302, 304, 505, 537; 347/1, 2, 5, 15, 19, 9, 13, 14, 20, 32, 347/16, 104, 55, 43, 172, 116, 129, 139, 347/157, 177, 187, 225, 232, 250, 119; 399/16, 17, 4, 6, 27, 28, 130, 151, 159, 399/288, 321, 352, 394, 357, 361, 2, 72, 399/373
See application file for complete search history.

(56) References Cited

U.S. PATENT DOCUMENTS

| 6,256,474 | B1* | 7/2001 | Gibisch et al. | 399/384 |
|---|---|---|---|---|
| 6,318,916 | B1 | 11/2001 | Hofmann | |
| 2003/0035671 | A1* | 2/2003 | Estabrooks | 399/385 |
| 2006/0056894 | A1 | 3/2006 | Kawashima et al. | |
| 2006/0061610 | A1* | 3/2006 | Tatsumi | 347/13 |
| 2008/0112746 | A1* | 5/2008 | Yamamoto | 399/385 |
| 2008/0143807 | A1 | 6/2008 | Bartley et al. | |
| 2010/0329756 | A1 | 12/2010 | Mizes | |
| 2011/0002699 | A1* | 1/2011 | Aoki | 399/17 |
| 2011/0242186 | A1 | 10/2011 | Mizes et al. | |
| 2011/0242187 | A1 | 10/2011 | Mongeon et al. | |
| 2011/0243636 | A1* | 10/2011 | Viturro et al. | 400/583 |
| 2011/0279505 | A1 | 11/2011 | Shin et al. | |

* cited by examiner

Primary Examiner — Ngon Nguyen
(74) Attorney, Agent, or Firm — Maginot, Moore & Beck, LLP

(57) ABSTRACT

A method for printing on a continuous print medium having a plurality of pages includes identifying a location of a feature in image data that are generated from a portion of a first page in the print medium. The method includes modifying a time of operation of a marking unit to form an image on each page in the plurality of pages at a predetermined distance from the edge of each page with reference to the location of the identified feature in the image data. In one configuration, the method enables precise placement of printed images over preprinted forms.

18 Claims, 8 Drawing Sheets

SYSTEM AND METHOD FOR PAGE ALIGNMENT IN A PRINTER

TECHNICAL FIELD

This disclosure relates generally to printing on continuous print media, and, more particularly, to printing images on multiple pages that are cut from a continuous print medium.

BACKGROUND

Some printing systems form printed images on rolls of paper or other print media. The media is pulled from a roll and ink images are formed on the media as the media passes through the printer. The printed media can be rolled into a take-up roll for removal from the printer or cut into individual sheets by a cutter that directly follows the printer. The take-up can be loaded into another apparatus that cuts the roll into individual sheets. Some media rolls are blank prior to be printed, while other rolls include existing markings, such as letterheads, logos, watermarks, and pre-printed form fields. For example, many such documents of this latter type include a pre-printed layout and the printer fills in each page with text, graphics, and any printed image that aligns with the existing markings on the print medium. Additionally, some media rolls include perforations that enable efficient separation of the individual pages of the roll after completion of the printing process.

During a printing operation, the printer forms printed images on each page in the media roll. The print medium moves through a print zone in a process direction to receive the printed images. Without proper registration in the process direction, however, the printed images may not properly align with each page. For example, printed text may appear in an incorrect position that does not align with markings in a pre-printed form. For severe misalignments, the printer may print an image that crosses a perforated edge between two different pages formed in the media roll instead of printing within a single page. While manual alignment of the print medium with the printer at the beginning of the print job can help produce accurately aligned images, variations in the print medium and movement in the print medium during the printing process result in process direction errors that increase over time during the printing process. Eventually, the errors may grow large enough that the printed pages have unacceptable alignment errors, which results in wasted paper and requires printer down time to realign the printer manually. Consequently, improvements to the alignment of printed images with pages formed in the print medium to maintain proper alignment during a printing process would be beneficial.

SUMMARY

In one embodiment, a method of operating a printer to form printed images on a print medium with a plurality of pages has been developed. The method includes moving a print medium through the printer in a process direction, the print medium including a plurality of pages with each page including a feature corresponding to an edge of each page in the process direction, generating, with an optical sensor, image data corresponding to a first portion of the print medium, identifying a location of the feature in the image data corresponding to an edge of a first page in the print medium, and modifying a time of operation of a marking unit in the printer to form an image on a subsequent page in the plurality of pages that follows the first page in the process direction at a predetermined distance from an edge of the subsequent page in the process direction, the modification of time being made with reference to the identified location of the feature corresponding to the edge of the first page in the image data.

In another embodiment, a printer that is configured to form printed images on a print medium with a plurality of pages has been developed. The printer includes a media transport configured to move a print medium in a process direction, the print medium including a plurality of pages with each page including a feature corresponding to an edge of each page in the process direction, a marking unit configured to form a printed image on the plurality of pages in the print medium, an optical sensor configured to generate image data corresponding to the print medium and the feature in each page of the print medium, and a controller operatively connected to the media transport, marking unit, and optical sensor. The controller is configured to operate the media transport to move the print medium in the process direction past the marking unit and the optical sensor, generate image data corresponding to a first portion of the print medium, identify a location of the feature in the image data corresponding to an edge of a first page in the print medium, and modify a time of operation of the marking unit and triggering of the optical sensor to form an image on a subsequent page in the plurality of pages that follows the first page in the process direction at a predetermined distance from the edge of the subsequent page in the process direction, the modification of time being made with reference to the location of the identified feature in the image data.

BRIEF DESCRIPTION OF THE DRAWINGS

The foregoing aspects and other features of a printer that forms printed images in alignment with page edges in a print medium are explained in the following description, taken in connection with the accompanying drawings.

DETAILED DESCRIPTION

Figure 1:
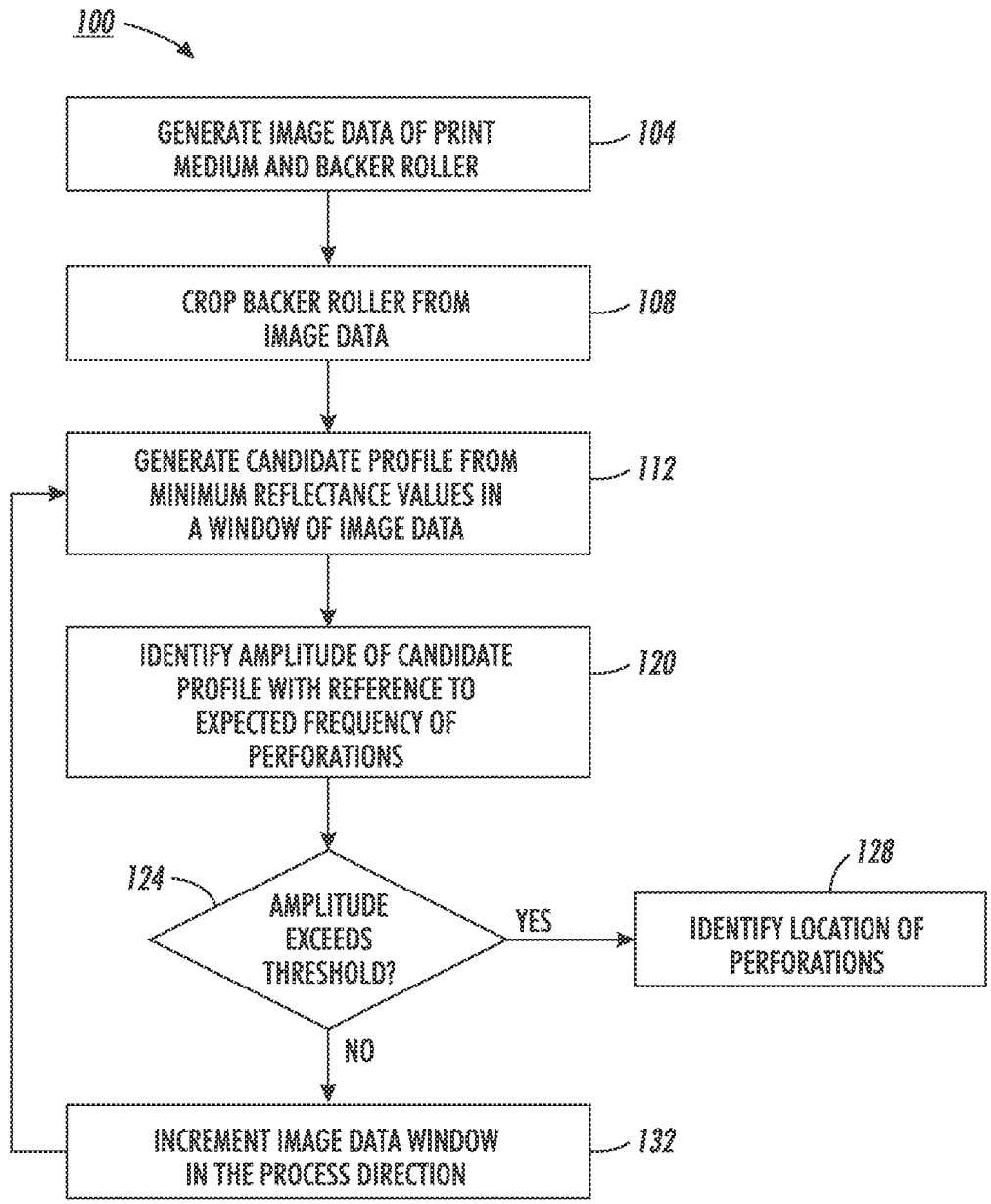
FIG. 1 is a block diagram of a process for identifying an edge of a page in a print medium with reference to a perforation or other linear feature formed in the print medium.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, etc.

As used herein, the term "pixel" refers to a single location in a two-dimensional arrangement of image data corresponding to light that is detected by an optical sensor in a printer. As described below, the optical sensor detects light reflected from a print medium, such as paper, from markings formed on the print medium, and from a support member that is located behind the print medium. The pixels in the image data capture features of the print medium in a digital format that is suitable for use with a digital controller or image processor.

As used herein, the term "feature" refers to any mark or visible discontinuity in the print medium that is formed either at the edge of a page within the print medium or at a predetermined distance from the edge of the page in a process direction. The optical sensor generates image data including pixels that correspond to the features to enable the printer form printed images that align with the edges of each page in the print medium. Features include perforations that are formed through the print medium to enable the print medium to be separated into a plurality of individual pages. The perforations include holes or other gaps that are formed in a regular pattern through the print medium. The optical sensor generates image data corresponding to portions of the backer roll that are exposed through the perforations as well as shadows that the print medium forms on the backer roller in the area of the perforations. Features also include markings that are formed on the print medium prior to the print medium passing through the printer. The markings can include printed logos, blank forms, watermarks, or any other markings that are formed on the pages prior the print medium being passed through the printer. The markings can be formed on a surface of the print medium that faces the optical sensor, on the surface of the print medium on the opposite side of the optical sensor, or can be embedded into the print medium.

As used herein, the term "process direction" refers to a direction of movement for a print medium, such as a continuous paper web, through a printer. The terms "process direction registration" and "process direction alignment" are used interchangeably and refer to the alignment of a printed image with either an edge of the page or with a feature formed on the page along the process direction. Errors in the process direction registration of a printed image can be perceived as improperly sized margins, misalignments between the printed image and features formed on the sheet prior to the printing process, and in severe cases can include errors where a printed image that is intended for a single page is formed on portions of two different pages.

As used herein, the term "page" refers to an individual print medium that is separated from a larger media roll after the printing process is completed. A continuous print medium, such as a paper roll, can include a large number of pages that are separated by perforations, or that have copies of preprinted logos or forms. The pages in the media roll pass through the media path and print zone in the printer in the process direction. As used herein, the terms "leading edge" and "trailing edge" refer to edges of each page that extend in the cross-process direction. The leading edge passes a given location in the media path first, followed by the trailing edge. In a media roll, the leading edge of one page is the trailing edge of the adjacent page in the media roll, and vice-versa, with the exception of the first and last pages in the roll. As used herein, the term "lateral edge" refers to an edge of the larger continuous print medium that extends in the process direction.

Figure 7:
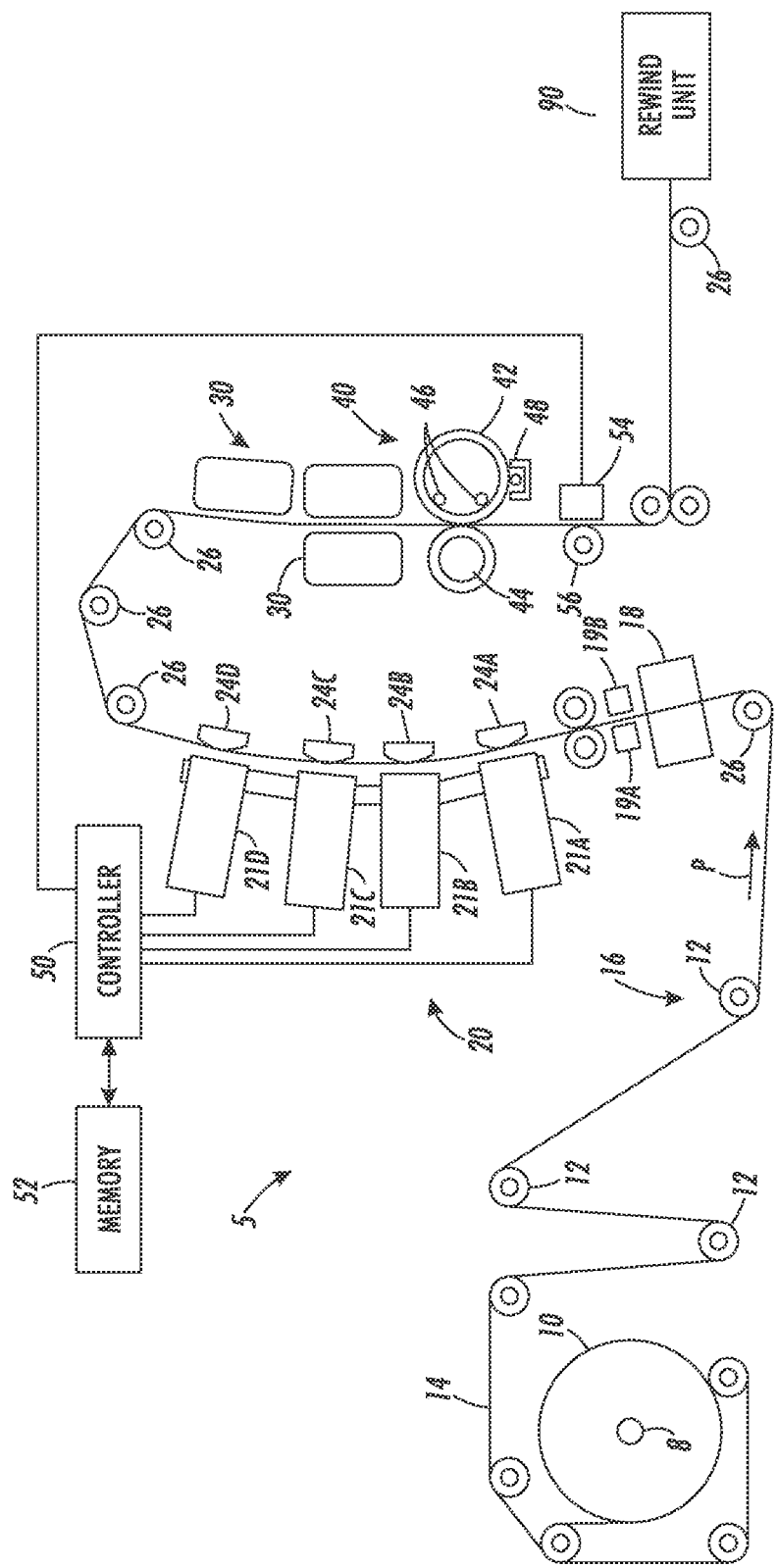
FIG. 7 is a schematic view of the prior art inkjet printer depicted in FIG. 6 that forms ink images on a continuous media web.

FIG. 7 depicts a prior-art inkjet printer 5. For the purposes of this disclosure, an inkjet printer employs one or more inkjet printheads to eject drops of ink into an image receiving member such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

The printer 5 includes a controller 50 to process the image data before generating the control signals for the inkjet ejectors to eject colorants. Colorants can be ink, or any suitable substance that includes one or more dyes or pigments and that is applied to the selected media. The colorant can be black, or any other desired color, and some printer configurations apply a plurality of distinct colorants to the media. The media includes any of a variety of substrates, including plain paper, coated paper, glossy paper, or transparencies, among others, and the media can be available in sheets, rolls, or other physical formats.

The printer 5 is an example of a direct-to-web, continuous-media, phase-change inkjet printer that includes a media supply and handling system configured to supply a long (i.e., substantially continuous) web of media 14 of "substrate" (paper, plastic, or other printable material) from a media source, such as spool of media 10 mounted on a web roller 8. The media web 14 includes a large number (e.g. thousands or tens of thousands) of individual pages that are separated into individual sheets with commercially available finishing devices after completion of the printing process. Some webs include perforations that are formed between pages in the web to promote efficient separation of the printed pages. For simplex printing, the printer 5 passes the media web 14 through a media conditioner 16, print zone 20, printed web conditioner 80, and rewind unit 90 once.

The media web 14 is unwound from the source 10 as needed and a variety of motors, not shown, rotate one or more rollers 12 and 26 to propel the media web 14. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of marking units or units 21A, 21B, 21C, and 21D, each marking unit effectively extends across the width of the media and is able to eject ink directly (i.e., without use of an intermediate or offset member) onto the moving media. In printer 5, each of the printheads ejects a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50. The digital data for the images to be printed can be transmitted to the printer, generated by a scanner (not shown) that is a component of the printer, or otherwise generated and delivered to the printer. In various configurations, a marking unit for each primary color includes one or more printheads; multiple printheads in a single marking unit are formed into a single row or multiple row array; printheads of a multiple row array are staggered; a printhead prints more than one color; or the printheads or portions thereof are mounted movably in a direction transverse to the process direction P for printing operations, such as for spot-color applications and the like.

Associated with each marking unit is a backing member 24A-24D, typically in the form of a bar or roll, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web 14 moves to receive inks of various colors from the printheads of the print zone 20, the printer 5 maintains the temperature of the media web within a given range. The printheads in the marking units 21A-21D eject ink at a temperature typically significantly higher than the temperature of the media web 14. Consequently, the ink heats the media, and temperature control devices can maintain the media web temperature within a predetermined range. For example, the air temperature and air flow rate behind and in front of the media web 14 impacts the media temperature. Accordingly, air blowers or fans can be utilized to facilitate control of the media temperature. Thus, the printer 5 maintains the temperature of the media web 14 within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 7, the fixing assembly includes a "spreader" 40, that applies a predetermined pressure, and in some implementations, heat, to the media. The function of the spreader 40 is flatten the individual ink droplets, strings of ink droplets, or lines of ink on web 14 and flatten the ink with pressure and, in some systems, heat. The spreader flattens the ink drops to fill spaces between adjacent drops and form uniform images on the media web 14. In addition to spreading the ink, the spreader 40 improves fixation of the ink image to the media web 14 by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web 14 to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in spreader 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roll. In one practical embodiment, the nip pressure is set in a range of about 500 to about 2000 psi lbs/side. Lower nip pressure produces less line spread while higher pressure may reduce pressure roller life.

The spreader 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web 14, with the printer 5 transferring approximately 1-10 mg per A4 sheet-sized portion of the media web 14. In one embodiment, the mid-heater 30 and spreader 40 are combined into a single unit, with their respective functions occurring relative to the same portion of media simultaneously. In another embodiment the media is maintained at a high temperature as the media exits the print zone 20 to enable spreading of the ink.

In printer 5, a controller 50 is operatively connected to various subsystems and components to regulate and control operation of the printer 5. The controller 50 is implemented with general or specialized programmable processors that execute programmed instructions. The instructions and data required to perform the programmed functions are stored in a memory 52 that is associated with the controller 50. The memory 52 stores programmed instructions for the controller, and can optionally store image data that is generated by an optical sensor 54. The processors, their memories, and interface circuitry configure the controllers and/or print engine to perform the printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively connected to the printheads in the marking units 21A-21D. The controller 50 generates electrical firing signals to operate the individual inkjets in the marking units 21A-21D to eject ink drops that form printed images on the media web 14. As described in more detail below, the controller 50 can adjust the time at which the firing signals are generated to change the position of the printed images on the media web 14 relative to the leading edge of each page in the process direction P. The controller 50 determines the timing for generation of the firing signals using one or more registration processes that identify individual pages in the media web 14 with reference to features that are formed in the media web 14.

The printer 5 includes an optical sensor 54 that is configured to generate image data corresponding to the media web 14 and a backer roller 56. The optical sensor is configured to generate signals indicative of reflectance values of the media, ink, or backer roll opposite the sensor to enable detection of, for example, the presence and/or location of ink drops jetted onto the receiving member by the inkjets of the printhead assembly. The optical sensor 54 includes an array of optical detectors mounted to a bar or other longitudinal structure that extends across the width of an imaging area on the image receiving member. In one embodiment in which the imaging area is approximately twenty inches wide in the cross-process direction and the printheads print at a resolution of 600 dpi in the cross-process direction, over 12,000 optical detectors are arrayed in a single row along the bar to generate a single scanline of image data corresponding to a line across the image receiving member. The optical detectors are configured in association in one or more light sources that direct light towards the surface of the image receiving member. The optical detectors receive the light generated by the light sources after the light is reflected from the image receiving member. The magnitude of the electrical signal generated by an optical detector corresponds to the amount of light reflected into the detector by the bare surface of the media web 14, markings formed on the media web 14, and portions of a backer roll 56 support member that are exposed to the optical sensor 54. The magnitudes of the electrical signals generated by the optical detectors are converted to digital values by an appropriate analog/digital converter.

Figure 6:
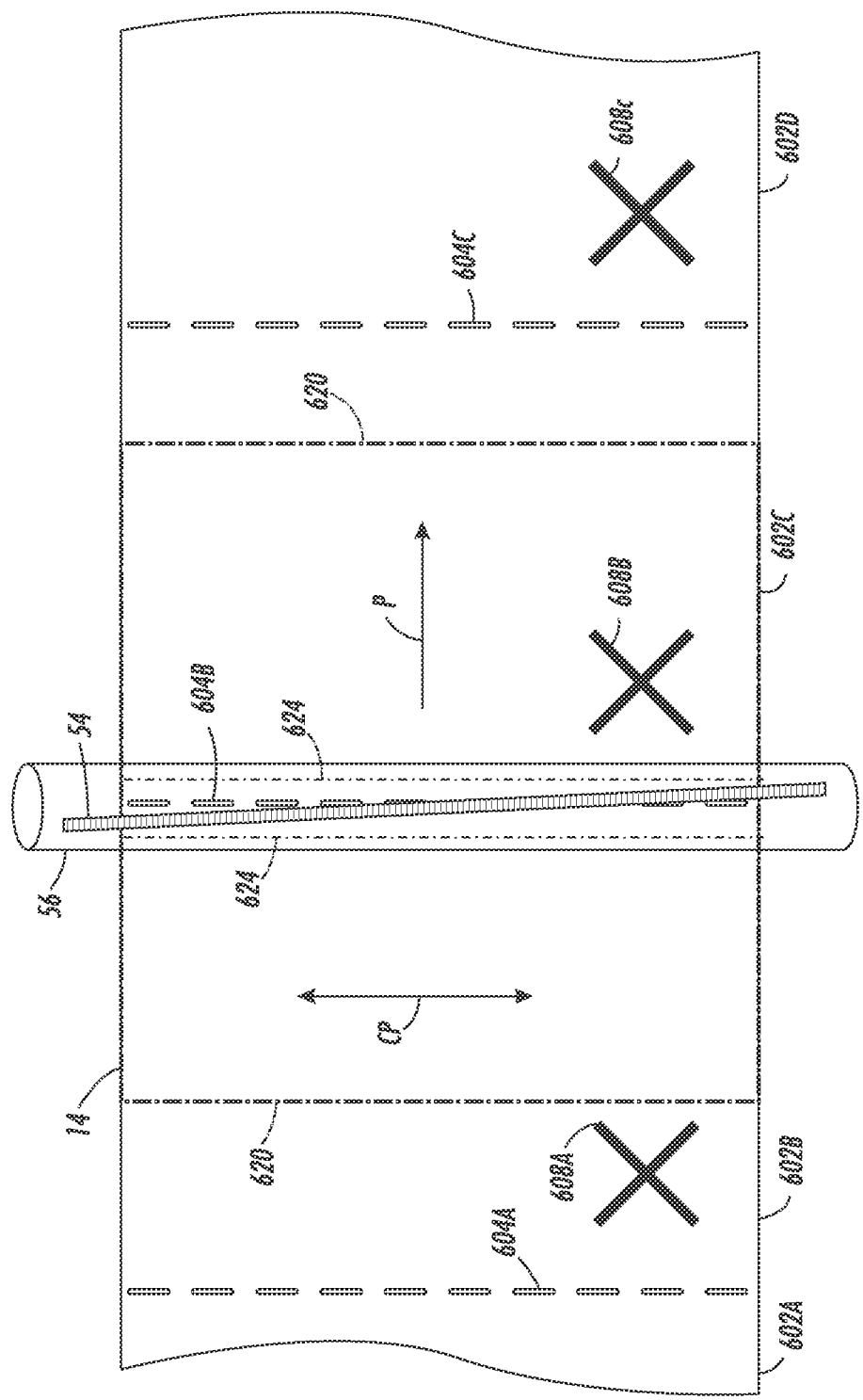
FIG. 6 is a schematic view of an optical sensor, backer roll, and media web in a prior art inkjet printer.

FIG. 6 depicts a portion of the media path in the printer 5 where the media web 14 passes between the optical sensor 54 and backer roll 56. As depicted in FIG. 6, the backer roller 56 is longer in the cross-process direction CP than the media web 14 in order to support the media web 14 and to enable the use of a wide range of media web sizes. The backer roll 56 is one embodiment of a support member that positions the media web 14 at a predetermined distance from the optical sensor 54. The backer roller 56 has a surface color that reflects most of the incident light to enable the optical sensor 54 to generate image data that are independent of the local thickness of the media. The optical sensor 54 generates image data from both the media web 14 and exposed portions of the backer roll 56.

FIG. 6 depicts all or a portion of four pages 602A, 602B, 602C, and 602D that are formed in the media web 14 and pass the optical sensor 54 and backer roll 56. In the configuration of FIG. 6, the media web 14 includes perforation features 604A, 604B, and 604C that are positioned between individual pages in the media web 14. The perforations 604A-604C extend across the media web 14 in the cross-process direction CP and enable efficient separation of the pages into individual sheets after the printer 5 forms images on the media web 14.

Each of the pages also includes a feature mark, including the feature marks 608A, 608B, and 608C in FIG. 6. Each of the feature marks 608A-608C is in the shape of an "X" in FIG. 6 but can be in any appropriate two-dimensional shape. Each of the marks 608A-608C is located at a predetermined distance in the process direction P from the a leading edge of pages 602B-602D, respectively. The marks 608A-608C are "pre-printed" marks, which is to say that the marks 608A-608B are formed prior to the media web 14 being passed through the printer 5. In one configuration, the marks 608A-608B are formed on a second side of the media web 14 that engages the backer roll 56 and does not directly face the image sensor 54. In a duplex printing operation, one of the printer 5 or another printing device forms the marks 608A-608C on a first side of the media web 14. The optical sensor 54 detects light that passes through the thickness of the media web 14 to enable duplexed images printed on the second side to be registered with images that are already printed on the first side in the process direction.

The imaging system 5 of FIG. 7 is merely illustrative of one embodiment of an imaging system that is configured to identify the leading or trailing edges of individual pages in a continuous print medium and form printed images that are registered to the leading or trailing edges of each page. Alternative imaging systems include, but are not limited to, indirect inkjet printing systems, xerographic printing systems, and any other printing system that registers printed images with the leading or trailing edges of pages formed in a continuous print medium.

FIG. 1 depicts a process 100 for identifying perforations through the print medium and other features that are formed in the print medium at regular intervals. In the discussion below, a reference to the process 100 performing a function or action refers to a controller executing programmed instructions stored in a memory operatively connected to the controller to operate one or more components to perform the function or action. Process 100 is described in conjunction with the printer 5 as depicted in FIG. 6 and FIG. 7 for illustrative purposes.

Process 100 begins by generating image data of the print medium and the backer roller (block 104). In the printer 5, the optical sensor 54 generates a series of scanlines, where each scanline is a one-dimensional arrangement of pixels corresponding to a line extending across the media web 14 and a portion of the backer roll 56 in the cross-process direction CP. The controller 50 generates a two-dimensional array of pixels corresponding to a section of the media web 14 from a series of scanlines as the media web 14 passes the optical sensor 54. The image data also include portions of the backer roll 56 that extends beyond the lateral edges of the media web 14 in the cross-process direction CP. The image data are generated over a sufficient length of the media web 14 in the process direction P to ensure that the perforations are included in the image data. In one embodiment, the optical sensor 54 generates image data for a region that is greater than the length of a single page in the media web 14 to ensure that the image data include at least one set of perforations. For example, in FIG.

6 the optical sensor 54 generates image data of the media web 14 within the region indicated by dashed lines 620 to include the perforations 604B.

The image data include portions of the backer roller 56 that extend beyond the lateral edges of the print medium. Process 100 crops, or deletes, portions of the image data that correspond to the portions of the backer roller that are beyond the lateral edges of the media web 14 (block 108). In one embodiment, the controller 50 identifies two transitions in the image data that corresponding to each lateral edge of the media web 14, and the controller 50 deletes image data that are beyond either lateral edge of the media web 14 in the cross-process direction CP. The surface of the backer roller 56 may contain contaminants and other markings that introduce noise into the image data. Process 100 crops the image data corresponding to the bare backer roller to improve the accuracy of identifying the perforations in the media web 14.

Figure 4A:
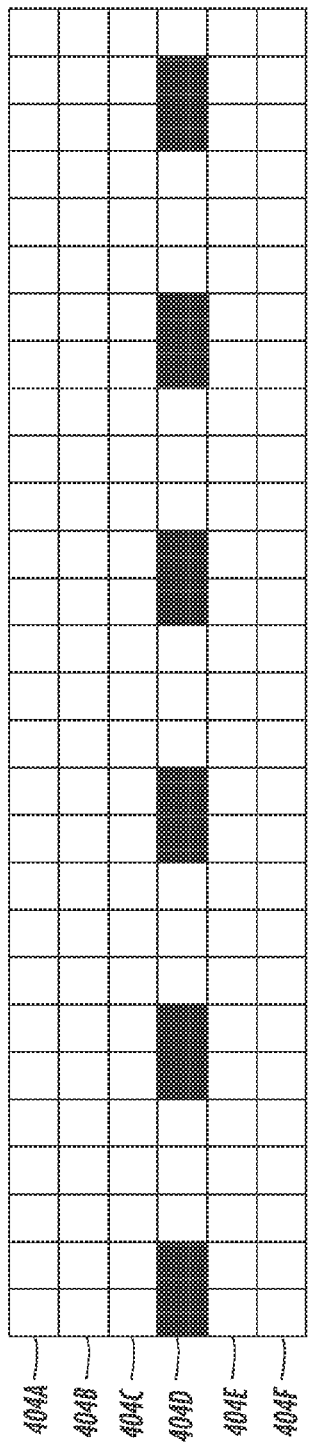
FIG. 4A is a simplified depiction of pixels of image data corresponding to perforations that are formed in a print medium.

During process 100, the controller 50 iterates through scanlines in the image data in the process direction until the perforation feature is identified. In some instances, the image data corresponding to the perforations could be stored in a single scanline in the image data. For example, in FIG. 4A, an exemplary set of scanlines 404A-404F includes a representation of the perforations in the single scanline 404D. In many cases, however, the sensor is rotated with respect to the perforations. In these circumstances the perforations are arranged in two or more scanlines in the image data. For example, in FIG. 6 the optical sensor 54 is skewed at an angle with respect to the cross-process direction CP. The amount of skew depicted in FIG. 6 is exaggerated for illustrative purposes, but the optical sensor 54 generates the image data corresponding to the perforations in multiple scanlines when even small amounts of skew or other irregularities in the perforations are present in the media web 14.

To identify perforations in the media web 14 correctly, process 100 generates a single candidate profile that includes pixels taken from a plurality of adjacent scanlines in a "window" of the image data (block 112). In the printer 5, the controller 50 selects a window of image data with a sufficient number of scanlines that can include the perforations when the optical sensor 54 is skewed. The number of scanlines included in the window is typically much smaller than the total number of scanlines in the image data that are used to identify the perforations. For example, in example of FIG. 6 the sensor 54 generates image data over the region 620 with a length of approximately 400 millimeters in the process direction P. The size of the window 624, however, is approximately 600 microns in the process direction P. Thus, in a configuration where the optical sensor 54 generates approximately fifteen scanlines per millimeter of the media web 14 in the process direction, the region 620 includes approximately six thousand one hundred (6100) scanlines and the window 624 includes ten (10) scanlines. The small size of the window enables accurate identification of the perforations in the process direction and minimizes the influence of random noise or non-perforation marks that are formed on different portions of the print medium.

Figure 4B:
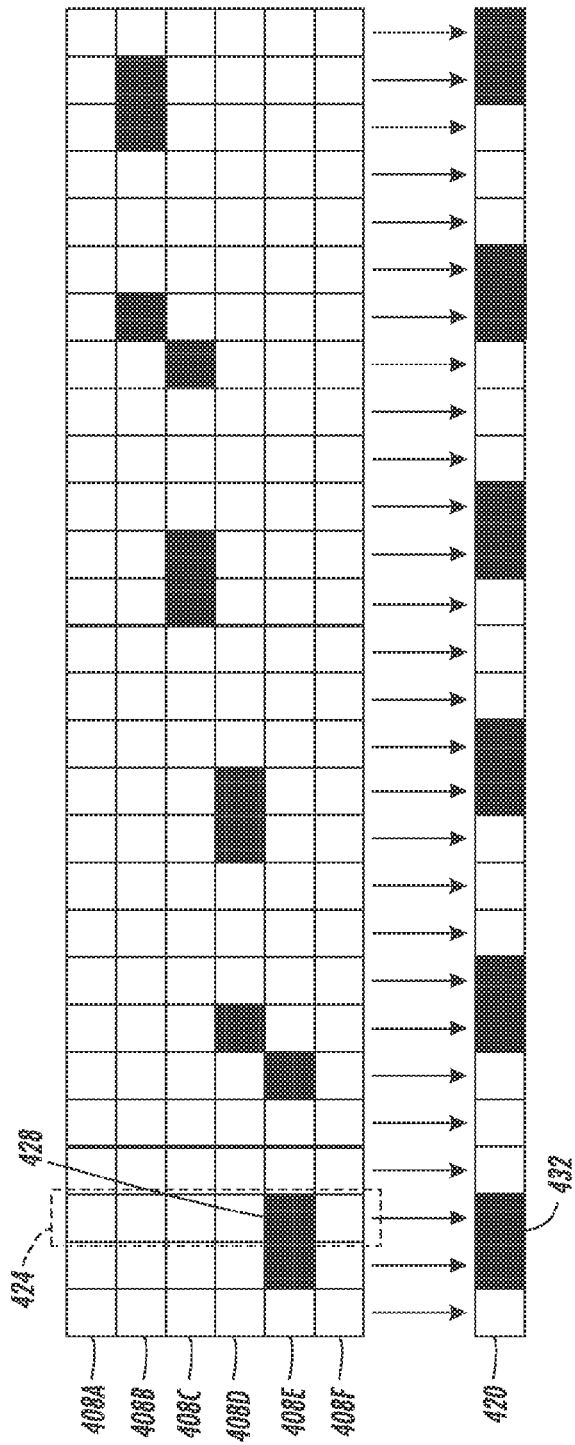
FIG. 4B is a simplified depiction of skewed pixels of image data corresponding to perforations that are formed in a print medium and a profile generated from the skewed pixels.

FIG. 4B depicts a scanline window including six scanlines 408A-408F that include image data corresponding to a series of perforations that are skewed in the process direction. Process 100 generates a candidate profile, such as the candidate profile 420 in FIG. 4B, using the minimum reflectance value identified in each column of pixels in the image data window. Each column of pixels is formed from a series of pixels that are generated by one of the optical detectors that are arranged in the optical sensor 54. For example, in FIG. 4B, a single optical detector generates the pixel column 424. In column 424, the pixel 428 has a minimum reflectance value, which corresponds to a portion of a perforation in the example of FIG. 4B. Process 100 includes the pixel 428 from scanline 408E as pixel 432 in the candidate profile 420. In one embodiment, the pixels in each column are sorted with reference to the reflectance value of each pixel to identify the pixel with the minimum reflectance value in each column.

Referring again to FIG. 1, process 100 identifies an amplitude of the candidate profile with reference to an expected frequency of the perforations in the image data (block 120). In the printer 5, the controller 50 can identify the amplitude using a matched filter that includes a function with a period equal to the expected spacing of perforations in the image data. For example, if the expected spacing between the perforations in the image data is five pixels in the cross-process direction, then the controller 50 applies a convolution to the profile with a sine function and a cosine function that both have periods corresponding to the five pixel separation between the individual perforations. The amplitude value is generated from a sum of the squares of both the sine and cosine convolutions. As depicted in FIG. 4B, the profile 420 includes individual perforations that are separated by five pixels of image data in the cross-process direction. The amplitude of the convolutions with the profile 420 is greater than the amplitude in other profiles in the image data that do not include the expected pattern of perforations. If the amplitude exceeds a predetermined threshold (block 124) then the controller 50 identifies the location of the perforations in the process direction (block 128) as the center scanline in the window that is used to generate the profile.

In an alternative embodiment, the controller 50 performs a Fourier transformation of the profile to generate a series of frequency responses and identifies an amplitude of the response at the expected frequency of the perforations (block 120). The match filter specifies the selected frequency or frequencies of the expected separation between the perforations in the profile. If the profile includes image data corresponding to the perforations, then the amplitude of the expected frequency is greater than the predetermined threshold (block 124). The controller 50 identifies the location of the perforations in the process direction (block 128) as the center scanline in the window that is used to generate the profile.

In either embodiment, if the amplitude that is generated for the profile is less than the predetermined threshold (block 124) then the controller 50 increments the image data window in the process direction (block 132) and repeats the processing described with reference to blocks 112-128 until the perforations are identified in the image data.

While process 100 is described for use in detecting the leading edges of pages based on the locations of perforations, process 100 can also identify other features that are formed on the print medium at regular intervals extending in the cross-process direction. For example, process 100 can also identify a dashed line that extends across each page in the print medium. In one exemplary configuration, the printer 5 or another printer prints images corresponding to multiple pages on a first side of the media web 14, including markings that are formed across the media web at regular intervals in the cross-process direction CP. The media web 14 is inverted and passed through the printer 5 for duplex printing on the second side of the media web. The sensor 54 responds only weakly to any individual marking on the first side of the media. However, when the captured image within a window encompasses these markings, and the captured image is processed in the same way as it is processed with the perforation marks, a signal can be extracted that indicates the presence of these marks on the opposite side of the web. The printer 5 then identifies the leading edge of each page on the second side of the print medium with reference to the marks on the first side of the print medium using process 100. During the printing process, the printer 5 registers the images formed for each page on the second side of the media web 14 with the pages that were previously formed on the first side of the media web 14. In the printer 5, the controller 50 adjusts the time of operation for the inkjets in the marking units 21A-21D for subsequent pages to register the printed images properly with the leading edges of each page in the media web 14.

As described above, perforations are one type of feature that indicates a leading or trailing edge of each page that is formed in the print medium. One advantage of using the perforations is that the location of each perforation defines a leading and trailing edge for multiple pages in the media web since the pages are separated along the perforation. In addition to perforations, other features that are formed in the individual pages of the media web at uniform distances from the leading or trailing edge of the media web can also be used to identify the leading or trailing edges of individual pages in the media web for process direction registration during a printing operation. While perforations are generally linear in nature and repeat at regular intervals in the cross-process direction, other features, such as printed logos, are two dimensional features that are often included only once in a predetermined location in each page. For example, as depicted in FIG. 6, a series of printed logos 608A-608C are formed on pages 602B-602D, respectively, of the media web 14 at a predetermined distance in the process direction P from the leading or trailing edge of each page.

Figure 2:
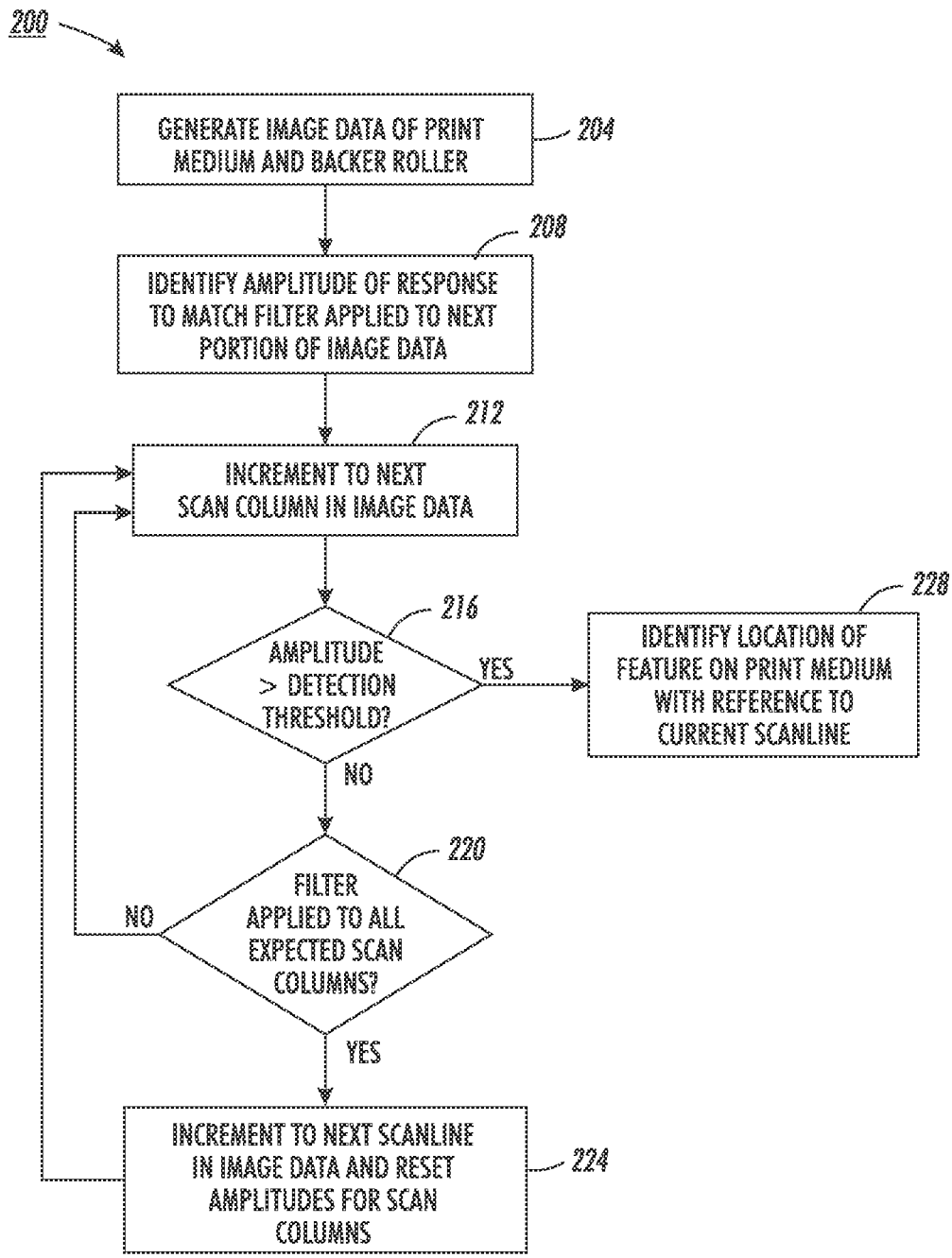
FIG. 2 is a block diagram of a process for identifying an edge of a page in a print medium with reference to a feature formed in the print medium.

FIG. 2 depicts a process 200 for identifying a feature that is formed in each page of a continuous, multi-page print medium at a predetermined distance in the process direction from a leading or trailing edge of each page. In the discussion below, a reference to the process 200 performing a function or action refers to a controller executing programmed instructions stored in a memory operatively connected to the controller to operate one or more components to perform the function or action. Process 200 is described in conjunction with the printer 5 as depicted in FIG. 6 and FIG. 7 for illustrative purposes.

Process 200 begins by generating image data of the print medium and the backer roller (block 204). In the printer 5, the optical sensor 54 generates a series of scanlines and the controller 50 generates two-dimensional image data corresponding to the series of scanlines as the media web 14 moves past the optical sensor 54 in the process direction P. In the printer 5, the controller 50 generates the image data in the processing noted in block 204 in the same manner as the image data was generated in the processing described with reference to block 104 in process 100. As depicted in FIG. 6, the controller 50 generates image data in the region 620 that is larger than a length of a single page in the process direction P to ensure that one of the printed features 608A, 608B, or 608C is included in the image data.

Figure 5:
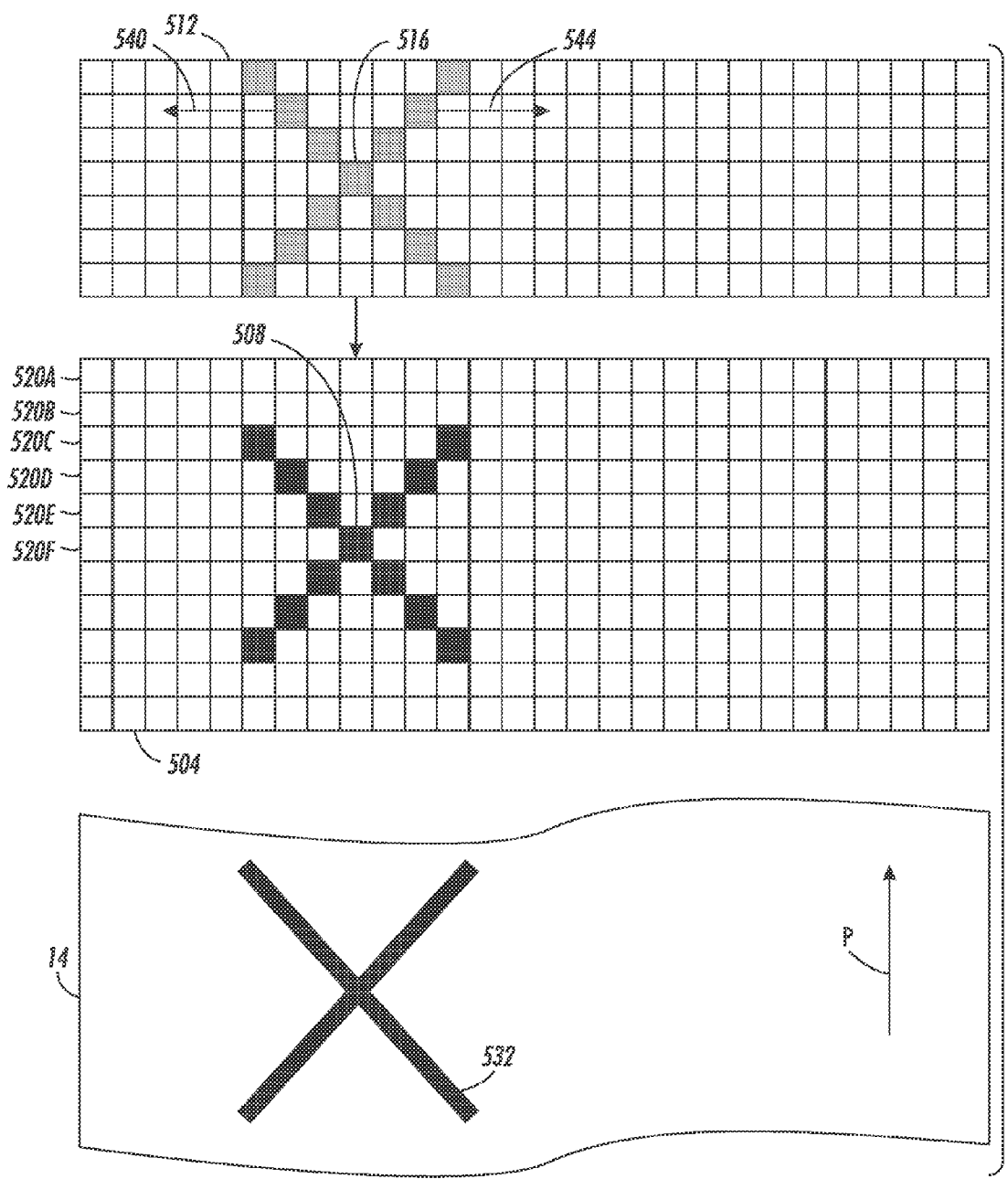
FIG. 5 is a simplified depiction of image data including a two-dimensional feature and a template in a match filter that is used to identity a location of the feature in the process direction.

Referring again to FIG. 2, process 200 continues by applying a match filter to a portion of the image data corresponding to the size of the feature (block 208). The application of the match filter generates an amplitude response that corresponds to the similarity of the image data to a template in the match filter. As depicted in FIG. 5, the image data 504 include pixels 508 corresponding to a feature. A match filter template 512 includes pixels 516 that correspond to the expected arrangement of the feature pixels 508. Under some circumstances the resolution of the image in the process direction captured by the optical sensor does not match the resolution of the image printed. For example, this condition occurs if the jetting frequency of the printheads that form the marks does not match the line scan frequency of the optical sensor 54.

In FIG. 5, a printed mark 532 formed on the media web 14 is detected by the optical scanner 54, but the scanning frequency of the optical sensor 54 is less than the firing frequency of the inkjets. Consequently, the scanned image data 508 appear to be compressed in the process direction P. Under other circumstances, the resolution of the image in the cross process direction does not match the resolution of the optical sensor 54 in the cross process direction. For example, if the spacing between the individual photodetectors in the optical sensor does not match the spacing between adjacent inkjets in the marking units 21A-21D, then the scanned image data can be compressed in the cross-process direction. If either one of these circumstances hold, the digital representation of the matched filter 516 is resampled to conform to the captured image data, such as image data 504, instead of conforming the digital representation to the printed mark 532. In the printer 5, the controller 50 aligns the match filter 512 with the image data 504 and applies the match filter to the section of the image data that is aligned with the match filter 512.

As the media web 14 travels through the media path, the position of the lateral edge of the paper relative to a fixed pixel of the optical sensor may vary slightly in the cross-process direction. The variation may occur due to how the media web 14 is unwound from the web roller 8, through the print zone 20, past the optical sensor 54, and then ultimately to the rewinder unit 90 or other finishing devices. Therefore, for each location in the process direction, the controller 50 applies the matched filter to the image data in each of a plurality of locations in the cross process direction, where the plurality of locations enable the expected variation of alignment of the feature with the optical sensor to be perceived. In FIG. 5, the template 516 can be shifted by one or more pixels in the cross-process directions 540 and 544 to compensate for a cross-process direction offset to the image data 504 due to variations in the cross-process direction location of the media web 14.

After each series of applications of the match filter, the controller 50 increments the section of the image data by one scan column in the image data (block 212). Each scan column includes a pixel from at least one scanline. For example in FIG. 5, the match filter template 512 is aligned with scanlines 520A-520E in successive iterations of the processing described with reference to block 212 and the controller 50 generates a response value for the match filter in scan columns through the in each of the scanlines.

After each application of the matched filter, the amplitude of the response is compared to a detection threshold (block 216). If the response exceeds the detection threshold, then the scanline corresponding to the maximum response of the match filter is identified as the location of the feature in the image data (block 228). In the example of FIG. 5, the pixels 516 in the template 512 align most accurately with the pixels 508 of the feature in the image data 504 when the template 512 is aligned with the scanline 520C. The amplitude of the response of the match filter has a maximum value at scanline 520C, and the controller 50 identifies the scanline 520C as the process direction location of the feature pixels 508. As depicted in FIG. 5 and FIG. 6, the features can be two-dimensional marks formed on the print medium. The location of a leading or trailing edge or a center of the mark is located at a predetermined distance from the leading or trailing edge of the page. Thus, the location of the leading or trailing edge of the page in the process direction is identified with reference to the location of the feature on the page. If the filter has been applied to all expected scan columns without the amplitude detection threshold being exceeded, then the scanline in the image data is incremented and the scan column is reset to its initial value. (block 224).

Either or both of processes 100 and 200 can be used to identify the leading or trailing edge of pages that are formed in a multi-page print medium, such as the media web 14 in the printer 5. The printer adjusts the operation of the marking unit to register printed images with the leading or trailing edges of each page in the process direction. During a printing operation, however, variations in the size of each page in the print medium and variations in the motion of the print medium may introduce errors in the process direction alignment that grow over time until the printed images exhibit unacceptable process direction registration errors. In addition, if the length of the page is not an integral number of scanlines, the error will also grow over time.

Figure 3:
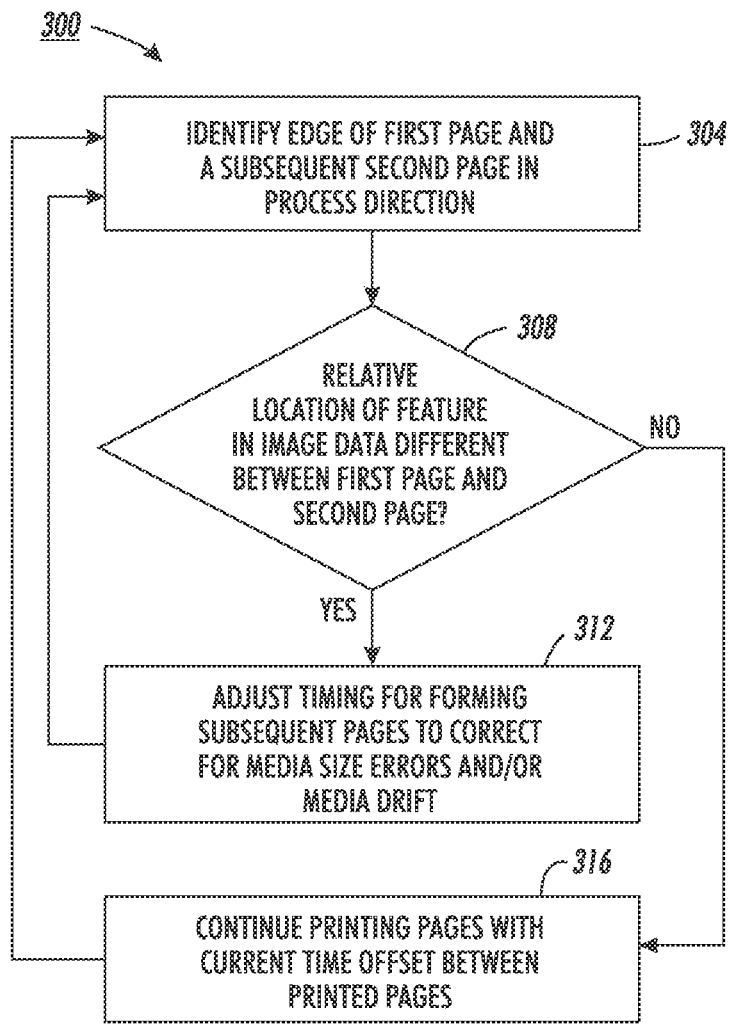
FIG. 3 is block diagram of a process for adjusting the operation of a printer to maintain process registration with individual pages formed in a larger print medium during a printing process.

FIG. 3 depicts a process 300 for correcting errors in the process registration of printed images that occur during a printing process. In the discussion below, a reference to the process 300 performing a function or action refers to a controller executing programmed instructions stored in a memory operatively connected to the controller to operate one or more components to perform the function or action. Process 300 is described in conjunction with the printer 5 as depicted in FIG. 6 and FIG. 7 for illustrative purposes.

Process 300 begins during a printing process when the printer 5 identifies a leading or trailing edge of a first page in the media web 14 and a leading or trailing edge of a subsequent second page in the media web 14 (block 304). The printer 5 can used either or both of the processes 100 and 200 described above to identify the edges of both the first and second pages.

Figure 4C:
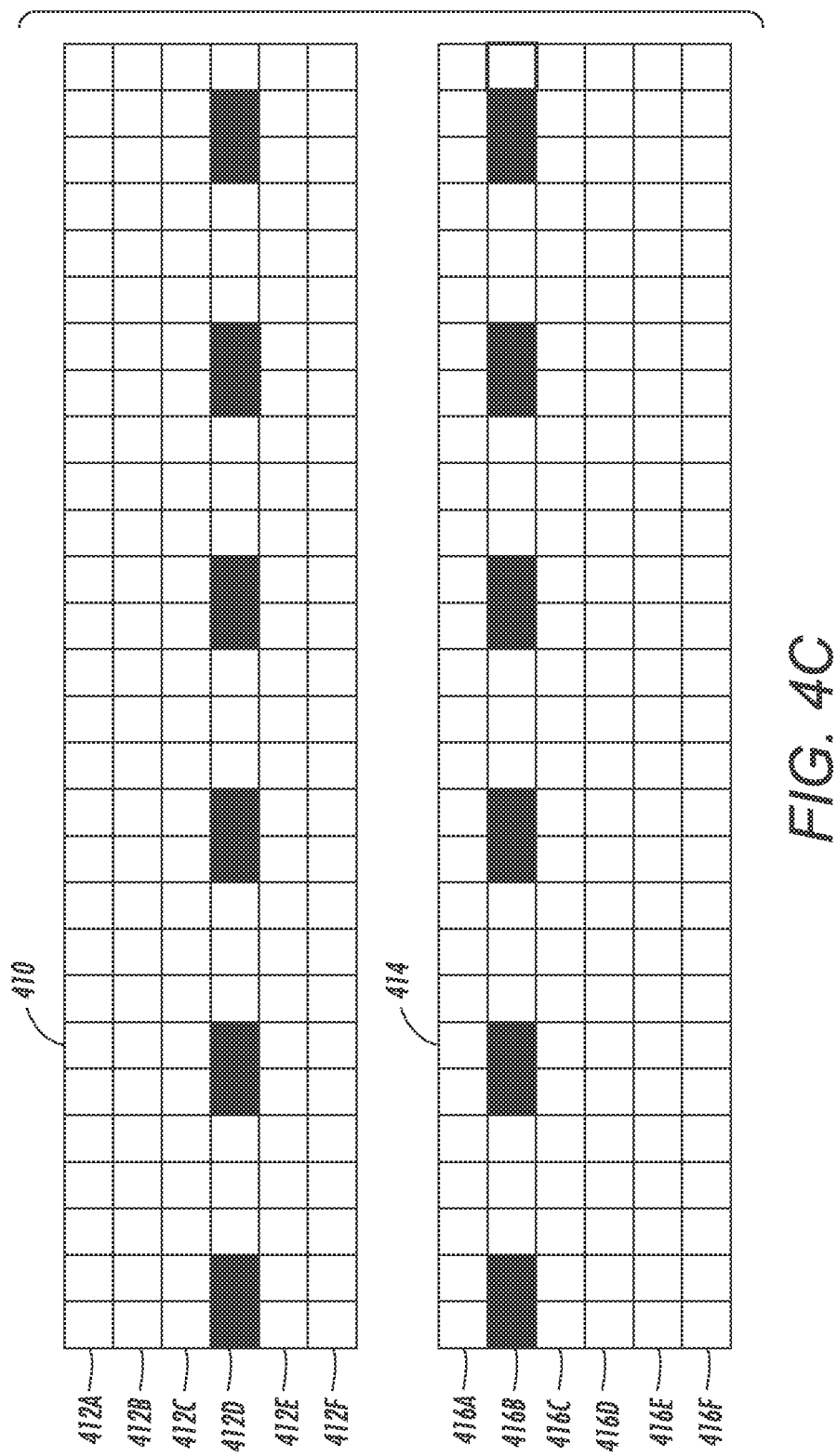
FIG. 4C is a simplified depiction of perforations formed in two different sets of image data corresponding to two different pages in the print medium.

Process 300 compares the relative locations of the identified feature in the image data generated for the first page and the image data generated for the second page to identify if the relative process direction location of the feature changes between the first page and second page (block 308). For example, FIG. 4C depicts image data 410 including a feature formed in a first page of the print medium and image data 414 including the feature formed in a second page of the print medium. The image data 410 includes the feature in the scanline 412D, and in the image data 414 includes the feature in the scanline 416B. Thus, the relative location of the feature in the image data 414 is offset by a process direction distance corresponding to two scanlines in the image data between the first page and the subsequent second page.

If the relative process direction location of the feature remains below a predetermined threshold between the first page and the second page (block 308) then the printer 5 continues printing additional pages in the print medium using the same time offset that is used to print the first page (block 316). Process 300 subsequently returns to perform the processing described with reference to block 304 to identify the locations of leading or trailing edges in additional pages of the print medium during the printing process.

If the relative process direction location of the feature changes between the first page and the second page (block 308), then the controller 50 adjusts the timing of operation of the inkjets in the marking units 21A-21D to correct for errors in the process direction registration of the printed images due to variations in the size of the printed pages, drift in the print medium, and inconsistencies between the number of scanlines expected for a single page and the actual length of the page (block 312). In the printer 5, the controller 50 decreases the delay between receiving the image data and sending the data for operating a printhead to each printhead and a trigger to the optical sensor in response to the relative location of the leading or trailing edge of the second page moving backward in the process direction. That is, the edge of the second page passes the optical sensor 54 at an earlier time than is expected during the printing process. The shorter delay triggers the optical sensor at an earlier time to reposition the feature at the center of the captured image data in the process direction. The controller 50 increases the delay in time in response to the relative location of the leading or trailing edge of the second page moving forward in the process direction, which is to say that the edge of the second page passes the optical sensor 54 at a later time that is expected during the printing process. The longer delay triggers the optical sensor later to reposition the feature at the center of the captured image data in the process direction. Process 300 subsequently returns to perform the processing described with reference to block 304 to identify the locations of leading or trailing edges in additional pages of the print medium during the printing process.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating a printer comprising:
    moving a print medium through the printer in a process direction, the print medium including a plurality of pages with each page including a feature corresponding to an edge of each page in the process direction;
    generating, with an optical sensor, image data corresponding to a first portion of the print medium;
    identifying a location of the feature in the image data corresponding to an edge of a first page in the print medium; and
    modifying a time of operation of a marking unit in the printer to form an image on a subsequent page in the plurality of pages that follows the first page in the process direction at a predetermined distance from an edge of the subsequent page in the process direction, the modification of time being made with reference to the identified location of the feature corresponding to the edge of the first page in the image data.

2. The method of claim 1, the feature being a plurality of perforations formed through the print medium at the edge of the first page, the perforations extending across the print medium at the edge of the first page in a cross-process direction.

3. The method of claim 2 further comprising:
    generating the image data with a plurality of pixel columns, each pixel column including a plurality of pixels extending in the process direction and the plurality of pixel columns being arranged in a cross-process direction;
    identifying a plurality of pixels in the image data, each pixel in the identified plurality of pixels being a pixel having a value in a predetermined range about a minimum value identified in the pixels of the plurality of pixel columns of the image data; and
    identifying a location of the plurality of the perforations in the image data with reference to the identified plurality of pixels.

4. The method of claim 2 further comprising:
    generating a template for a match filter corresponding to a predetermined width of each perforation in the plurality of perforations and a predetermined distance separating each perforation in the plurality of perforations;

applying the match filter with the template to a plurality of locations in the image data; and identifying a location of the plurality of perforations in the image data corresponding to one location in the plurality of locations in the image data where the match filter generates a maximum response.

5. The method of claim 1, the feature being a marking formed on the print medium at a predetermined distance from the edge of the first page, the marking being formed prior to the print medium moving though the printer.

6. The method of claim 1, the identification of the feature further comprising:

applying a match filter with a template corresponding to the feature to a plurality of locations in the image data; and identifying the location of the feature in the image data corresponding to one location in the plurality of locations in the image data where the match filter generates a maximum response.

7. The method of claim 6 further comprising:

removing a plurality of pixels from the image data that correspond to a support member that extends past an edge of the print medium in a cross-process direction prior to the match filter being applied to the image data.

8. The method of claim 1 further comprising:

generating with the optical sensor other image data corresponding to a second portion of the print medium at an offset in the process direction that corresponds to a distance from the edge of the first page to an edge of a second subsequent page;

identifying another location of the feature in the other image data corresponding to the edge of the second page;

identifying a difference between the location of the feature in the image data and the other location of the feature in the other image data; and modifying a time of operation of the optical sensor in response to the identified difference exceeding a predetermined threshold to enable identification of the feature in a third portion of the print medium that corresponds to a third page in the print medium.

9. A printer comprising:

a media transport configured to move a print medium in a process direction, the print medium including a plurality of pages with each page including a feature corresponding to an edge of each page in the process direction;

a marking unit configured to form a printed image on the plurality of pages in the print medium;

an optical sensor configured to generate image data corresponding to the print medium and the feature in each page of the print medium; and a controller operatively connected to the media transport, marking unit, and optical sensor, the controller being configured to:

operate the media transport to move the print medium in the process direction past the marking unit and the optical sensor;

generate image data corresponding to a first portion of the print medium;

identify a location of the feature in the image data corresponding to an edge of a first page in the print medium; and modify a time of operation of the marking unit and triggering of the optical sensor to form an image on a subsequent page in the plurality of pages that follows the first page in the process direction at a predetermined distance from the edge of the subsequent page in the process direction, the modification of time being made with reference to the location of the identified feature in the image data.

10. The printer of claim 9, the feature being a plurality of perforations formed through the print medium at the edge of the first page, the perforations extending across the print medium at the edge of the first page in a cross-process direction.

11. The printer of claim 10, the controller being further configured to:

generate the image data with a plurality of pixel columns, each pixel column including a plurality of pixels extending in the process direction and the plurality of pixel columns being arranged in a cross-process direction;

identify a plurality of pixels in the image data, each pixel in the plurality of pixels being a pixel having a value in a predetermined range about a minimum value identified in the pixels of the plurality of pixel columns of the image data; and identify a location of the plurality of the perforations in the image data with reference to the identified plurality of pixels.

12. The printer of claim 10, the controller being further configured to:

generate a template for a match filter corresponding to a predetermined width of each perforation in the plurality of perforations and a predetermined distance separating each perforation in the plurality of perforations;

apply the match filter with the template to a plurality of locations in the image data; and identify a location of the plurality of perforations in the image data corresponding to one location in the plurality of locations in the image data where the match filter generates a maximum response.

13. The printer of claim 9, the feature being a marking formed on the print medium at a predetermined distance from the edge of the first page, the marking being formed prior to the print medium passing the marking unit.

14. The printer of claim 9, the controller being further configured to:

apply a match filter with a template corresponding to the feature to a plurality of locations in the image data; and identify the location of the feature in the image data corresponding to one location in the plurality of locations in the image data where the match filter generates a maximum response.

15. The printer of claim 14, the controller being further configured to:

remove a plurality of pixels from the image data that correspond to a support member that extends past an edge of the print medium in a cross-process direction prior to the match filter being applied to the image data.

16. The printer of claim 9, the controller being further configured to:

generate other image data corresponding to a second portion of the print medium at an offset in the process direction that corresponds to a distance from the edge of the first page to an edge of a second page;

identify another location of the feature in the other image data corresponding to the edge of the second page;

identify a difference between the location of the feature in the image data and the other location of the feature in the other image data; and modify a time of triggering the optical sensor in response to the identified difference exceeding a predetermined threshold to enable identification of the feature in a third portion of the print medium corresponding to a third page in the print medium.

17. The printer of claim 9, the marking unit being a plurality of inkjets configured to eject ink drops onto an image receiving surface.

18. The printer of claim 9, the marking unit being a xerographic marking unit configured to deposit toner onto an image receiving surface.

* * * * *